April 5, 1932.

C. E. SUMMERS

INTERNAL COMBUSTION ENGINE

Original Filed June 11, 1923

Re. 18,414

Witnesses.
Elmer E. Fred
Wm. F. Pascd.

By

Inventor.
Caleb E. Summers
Francis D. Hardesty
his Attorney.

Reissued Apr. 5, 1932 Re. 18,414

UNITED STATES PATENT OFFICE

CALEB E. SUMMERS, OF PONTIAC, MICHIGAN, ASSIGNOR TO GENERAL MOTORS RESEARCH CORPORATION, OF DAYTON, OHIO, A CORPORATION OF DELAWARE

INTERNAL COMBUSTION ENGINE

Original No. 1,668,471, dated May 1, 1928, Serial No. 644,528, filed June 11, 1923. Application for reissue filed April 28, 1930. Serial No. 448,140.

This invention relates to internal combustion engines and has as a general object the prevention of knocking upon the firing of the charge, whereby the degree of compression of the charge may be advantageously increased with a consequent increase in the efficiency and power of the engine.

A more specific object is to divide the compression space into a plurality of compartments in all of which the charge is compressed on the compression stroke of the piston but in which the charge is ignited successively, that is, the propagation of the flame is delayed in passing from one compartment to the other.

Another object is to accomplish the above objects in a simple manner by making a slight change in the structure of the cylinder head of an engine of an ordinary design.

Further objects and advantages of the present invention will be apparent from the following description, reference being had to the accompanying drawings, wherein a preferred form of embodiment of the present invention is clearly shown.

In the drawings.

Similar reference characters refer to similar parts in the drawings.

Figure 1:
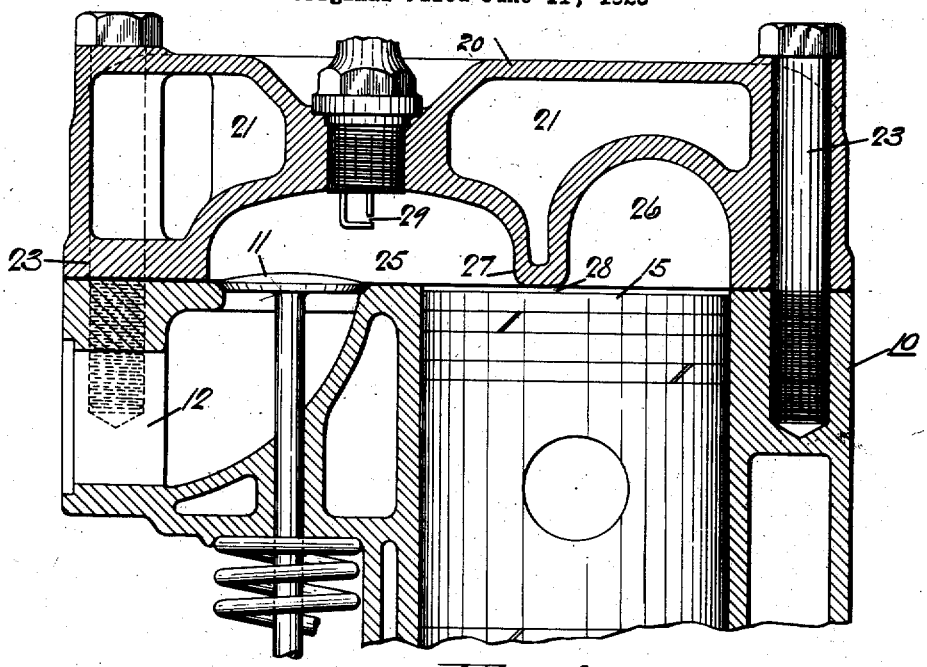
Fig. 1 is a vertical transverse section on line 1—1 of Fig. 2 of a multicylinder internal combustion engine made according to this invention.
Figure 2:
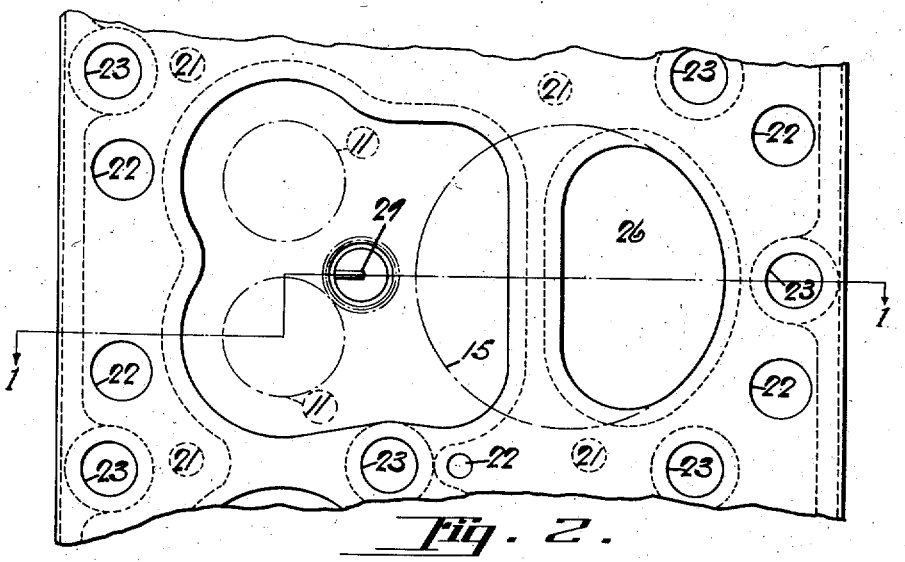
Fig. 2 is a bottom plan view of the cylinder head detached from the cylinder block.

A conventional design of L-head cylinder block 10 has been illustrated in Fig. 1, having the ordinary poppet valves 11 (only one of which is shown in Fig. 1) and the inlet or exhaust passages 12 leading thereto. The piston 15 is shown at its upper dead center, at which point its upper surface falls substantially at the upper edge of the cylinder bore. The cylinder head casting 20 is provided with the usual cooling water circulating spaces 21 and the holes 22 which permit the passage of the cooling water from the cylinder jacket to the head spaces 21, all substantially according to conventional design. The cylinder head casting 20 may be bolted down upon the cylinder block 10 by suitable stud bolts 23, or by any other suitable means.

Now according to this invention the cylinder head 20 is provided with two recessed spaces 25 and 26 which serve as the compression chambers for the fuel charge which enters said spaces through the poppet valve 11. The depending dividing wall 27 between chambers 25 and 26 preferably has only a small clearance 28 with the piston 15 when it is at top dead center, as shown in Fig. 1. It will be seen that as the piston comes up on it compression stroke the fuel charge will be compressed to equal pressures within both chambers 25 and 26, since the gases have a free passage between the two chambers 25 and 26 until the piston reaches its top dead center. Preferably the dividing wall 27 is so positioned relative to the bore of the cylinder that when the piston is nearing the end of its compression stroke some of the compressed gases will rush from chamber 26 through the clearance passage 28 into chamber 25. This will cause a great turbulence within chamber 25 at the time when the charge within that chamber is ignited by some suitable means such as by the electrical spark plug 29 shown in Fig. 1. This turbulence within chamber 25 at the time of ignition reduces the tendency of the engine to knock probably because the turbulence breaks up the flame front as it passes from the ignition point toward the chamber walls in all directions.

However the chief cause for the reduction of the fuel knock with this form of cylinder head is the division of the compression space into two chambers 25 and 26 and firing the charges in the chambers successively, or at least delaying the passage of the flame front as it passes from one chamber into the other. The theory of operation of this invention is as follows: When the fuel charge is first ignited at the point 29 the flame front begins to travel radially outwardly from this point as a center in all directions, the propagation of the flame front taking place by some sort of progressive action from molecule to molecule. However, after a certain percentage of the fuel charge has been burnt by this progressive action the liberated heat will cause such a great increase in temperature and pressure throughout the entire chamber 25 that the remaining unburnt fuel charge will be spontaneously ignited throughout its volume by the increased temperature and pressure. It is thought that this spontaneous burning, of part of the fuel charge causes the ordinary fuel knock so well known. By substantially dividing off part of the fuel charge in chamber 26 the volume of the charge which is spontaneously ignited is greatly reduced and hence the knock is minimized or entirely eliminated. The narrow passageway 28 is made sufficiently small to prevent the temperature and pressure within chamber 26 from rising rapidly enough to cause spontaneous combustion of part of the charge in chamber 25. In other words the passageway 28 is restricted so that the burning of the fuel charge in chamber 26 does not occur at the same time with that in chamber 25 but a slight interval of time thereafter. The timing of the ignition spark may be advanced in the ordinary manner but the piston should reach its upper dead center in time to choke off or delay the passage of the flame front through the passageway 28. The best timing of the ignition may be very readily determined by experiment for any given engine or design.

It is to be understood that the above description of operation is given merely as a theory and it is not intended that the invention be limited in any way by the correctness thereof. The description and drawings will enable any one skilled in the art to practice this invention and obtain desired results regardless of what may be the actual manner of its operation.

Another advantage of this design of cylinder head is that it presents a considerably greater cooling area per unit of volume of the compression space and hence permits higher compression pressures without danger of preignition than do the ordinary more or less flat roofed compression chambers. In this connection it will be noted that the entire ceiling and sides of the double domed combustion chamber are exposed to the cooling fluid in the jacket and that the hollow partition 27 is constituted by a pair of spaced walls with the open space therebetween forming a part of the jacket space 21 and extending to the lower wall of the head to effectively insure cooling of the partition.

While the invention has been illustrated and described in detail as relating to a four-cycle engine it is to be understood that the principles of this invention may be also employed with a two cycle engine in substantially the same manner.

While the form of embodiment of the present invention as herein disclosed, constitutes a preferred form, it is to be understood that other forms might be adopted, all coming within the scope of the claims which follow.

What I claim is as follows:

1. In an internal combustion engine, a cylinder having a chamber in direct and permanently open communication with the interior thereof above the upper end of the piston when the piston is at the end of its compression stroke, ports leading into and out from said chamber; valves for controlling said ports; an igniting device for igniting combustible mixture within said chamber; said cylinder having also a second chamber which is closed, and the lower end of which is in direct and permanently open communication with the interior of the cylinder above the upper end of the piston when the piston is at the end of its compression stroke; and a dividing wall between said two chambers, and the lower edge of which wall lies closely adjacent the upper end of the piston when the same is at the end of its compression stroke.

2. In an internal combustion engine, a cylinder and a piston operating therein; a cylinder head for closing the upper end of said cylinder; a chamber formed in said head above the plane of the underside thereof, and which chamber is in direct and permanently open communication with the interior of the engine cylinder above the upper end of the piston when the same is at the end of its compression stroke; ports leading into and out from said chamber and valves for controlling said ports; an igniting device for igniting combustible mixture within said chamber; a second chamber formed in said cylinder head above the plane of the underside thereof, and which chamber is closed except that its lower end is in direct and permanently open communication with the interior of the cylinder above the upper end of the piston when the same is at the end of its compression stroke; and a dividing wall formed in said cylinder head and serving to separate said two chambers from one another, and the lower edge of which wall lies substantially in the plane of the underside of said head and closely adjacent the upper end of the piston when the same is at the end of its compression stroke.

3. In an internal combustion engine, a cylinder having a bore, a piston therein, a head provided with a combustion space consisting of two chambers both in direct and open communication with the cylinder bore and being formed by a depending wall extending transversely across the end of the bore, one chamber having valve controlled ports and the other being devoid of communication with the exterior except through the ports of said ported chamber.

4. The structure set forth in claim 3 wherein the head is jacketed for the flow of cooling medium and the depending wall is hollow so as to form a part of the cooling jacket.

5. In an internal combustion engine, a head having a hollow space therein constituting a jacket for the flow of cooling fluid and providing a combustion chamber on its underside, a hollow partition depending from the ceiling of the combustion chamber into substantial alinement with the underside of the head to provide on such underside a pair of independent recesses opening downwardly for the successive burning of fuel therein, and comprising double walls with a space therebetween that communicates with and forms a part of the cooling jacket.

6. In an internal combustion engine, an engine block having a cylinder bore and inlet and exhaust ports to one side of the cylinder bore, a cylinder head having a combustion space comprising a chamber portion overlying the inlet and exhaust ports and having a fuel igniting device therein, a dome portion overlying the cylinder in offset relation to the axis thereof and being devoid of communication with the exterior except thru the ports of the ported chamber and means affording restricted communication between the ported chamber and dome.

7. In an internal combustion engine, an engine block having a cylinder bore, and a reciprocating piston therein, a head provided with a combustion space consisting of two chamber portions connected by a restricted passage formed by the head and the piston when the piston is in its uppermost position and both in direct and permanently open communication with the cylinder bore, valve controlled inlet and outlet ports communicating with one of said chambers and an ignition device therein, the other chamber being devoid of communication with the exterior except through the ports of the ported chamber.

8. In an internal combustion engine, an engine block having a cylinder bore and a reciprocating piston therein, a head provided with a combustion space communicating with the cylinder bore; said combustion space consisting of two chambers communicating by a restricted passage formed by the head and the piston when the piston is in its uppermost position, one of said chambers being offset and extending partly to one side of the bore and partly in overlapping relation with the bore so as to be in direct open communication therewith, valve controlled inlet and outlet ports communicating with said offset chamber and an ignition device therein; the other chamber being devoid of communication with the exterior except through the ports of the ported chamber and being in direct open communication with the cylinder bore at all times.

In testimony whereof I affix my signature.

CALEB E. SUMMERS.